United States Patent
Lester et al.

(10) Patent No.: US 6,745,043 B1
(45) Date of Patent: Jun. 1, 2004

(54) PRIORTY COMMUNICATION SYSTEM AND METHOD OF OPERATION

(75) Inventors: Leland Lester, Austin, TX (US); David Iglehart, Austin, TX (US); Elie A. Jreij, Pflugerville, TX (US)

(73) Assignee: Siemens Information & Communications Mobile, LLC, San Diego, CA (US)

( * ) Notice: Subject to any disclaimer, the term of this patent is extended or adjusted under 35 U.S.C. 154(b) by 0 days.

(21) Appl. No.: 09/148,991

(22) Filed: Sep. 3, 1998

(51) Int. Cl.[7] .................................................. H04Q 7/00
(52) U.S. Cl. ................... 455/512; 455/517; 455/426.1; 455/450
(58) Field of Search ................................ 455/512, 527, 455/162.2, 519, 404, 521, 422, 426, 447, 464, 518, 505, 450, 463, 404.1, 422.1, 426.1; 379/161, 208

(56) References Cited

U.S. PATENT DOCUMENTS

| | | | | |
|---|---|---|---|---|
| 3,985,962 A | * | 10/1976 | Jones et al. .................. 370/455 |
| 4,012,597 A | * | 3/1977 | Lynk et al. .................. 455/512 |
| 4,856,083 A | * | 8/1989 | Makino ...................... 455/166.2 |
| 4,882,766 A | * | 11/1989 | Akaiwa ........................ 455/512 |
| 5,243,641 A | * | 9/1993 | Evans et al. ................. 455/439 |
| 5,257,416 A | * | 10/1993 | Cannon ...................... 455/166.2 |
| 5,329,578 A | * | 7/1994 | Brennan et al. ............. 379/167 |
| 5,363,428 A | * | 11/1994 | Nagashima .................. 455/452 |
| 5,384,841 A | * | 1/1995 | Adams et al. .......... 379/207.15 |
| 5,465,388 A | * | 11/1995 | Zicker ........................ 455/404 |
| 5,570,411 A | * | 10/1996 | Sicher ........................ 455/450 |
| 5,574,774 A | * | 11/1996 | Ahlberg et al. ............. 455/422 |
| 5,615,249 A | * | 3/1997 | Solondz et al. ............. 455/450 |
| 5,634,197 A | * | 5/1997 | Paavonen .................... 455/512 |
| 5,752,193 A | * | 5/1998 | Scholefield et al. ........ 455/452 |
| 5,841,848 A | * | 11/1998 | Dunn ......................... 379/138 |
| 5,867,790 A | * | 2/1999 | Hamada ..................... 455/509 |
| 5,903,848 A | * | 5/1999 | Takahashi ................... 455/512 |
| 6,009,331 A | * | 12/1999 | Ueda ......................... 455/450 |
| 6,067,457 A | * | 5/2000 | Erickson et al. ............ 455/512 |
| 6,134,310 A | * | 10/2000 | Swan et al. ................ 379/188 |

* cited by examiner

*Primary Examiner*—Sonny Trinh

(57) ABSTRACT

A priority communication system (12) is provided. The priority communication system (12) comprises a plurality of communication devices (16) and a switching system (18) for communicating with the plurality of communication devices (16) over a limited number of communication channels (20). The switching system (18) operates to assign a received communication signal (24) to an open communication channel (20) based on a priority rating of the received communication signal (24). The switching system (18) may also operate to terminate a communication link having a priority rating lower than the priority rating of the received communication signal (24) in order to open a communication channel (20) and establish a communication link for the received communication signal (24).

24 Claims, 4 Drawing Sheets

PRIORTY COMMUNICATION SYSTEM AND METHOD OF OPERATION

BACKGROUND OF THE INVENTION

Communication systems are used in nearly all aspects of modern society and technology to establish a communications link for transferring information from one communication device, such as a telephone, to another communication device, such as another telephone. In many communication systems, the cost of the communication system is reduced by reducing the number of communication channels, or lines, between the various communication devices.

Some conventional communication systems multiplex the communication devices to the reduced number of communication channels in order to support all of the communication devices at one time. In other communication systems, a direct communications link is dedicated to the communication devices, but it is presumed that not all of the communication devices will be in use at the same time.

An example of a direct communication link system is a cordless phone system having a base station and a number of handsets, with the number of handsets greater than the number of radio frequency channels that can be supported at the same time by the base station. In other words, assuming that the base station has ten radio frequency channels that allow ten different handsets to be used at the same time, instead of having only ten handsets associated with the base station, eleven or more handsets are associated with the base station. Eleven or more handsets can be associated with the base station because it is presumed that only ten or fewer of the handsets will be in use at any one time.

Conventional communication systems that establish a direct communications link can become overloaded during peak usage times, such that some customers cannot establish a communication link. In these situations, a customer must wait until a communication channel becomes open and available. In many situations, the customer has an important communication link, such as a conference call, to establish that is more important than many of the other communication links currently in use. Conventional communication systems do not account for the priority of the various communication links.

SUMMARY OF THE INVENTION

Accordingly, a need has arisen for a priority communication system and method of operation. The present invention provides a priority communication system and method of operation that substantially reduces or eliminates problems associated with prior systems and methods.

In accordance with one embodiment of the present invention, a method of prioritizing communication signals is provided. The method comprises providing a switching system that includes a programmable priority communication list. The switching system operates to communicate with a number of communication devices over a limited number of communication channels. The switching system receives a communication signal that includes a signal identifier. A priority rating based on a comparison of the signal identifier to the priority communication list is assigned to the received communication signal. If the priority rating is higher than a communication link that has been established, the communication link is terminated in order to open a communication channel. The received communication signal is then assigned the open communication channel. In a particular embodiment, the priority rating has multiple priority levels that determine if and when a communication link should be terminated.

Technical advantages of the present invention include providing a priority rating system that allows important communication links to be established even during peak use. For example, emergency phone numbers for the police, fire, security, and the like, can be included in the priority communication list in order to provide an immediate communications link to report the emergency. Accordingly, customer safety is increased.

Another technical advantage of the present invention is that the priority communication list can be reprogrammed to add or delete specific signal identifiers. Accordingly, the priority rating system is flexible and can change with the needs of the customer.

Yet another technical advantage of the present invention is that the communications system can be adapted to recognize various signal identifiers. For example, the signal identifier may be a password entered into the communication device, a communication device setting, a phone number, and any suitable combination of the above.

Other technical advantages will be readily apparent to one skilled in the art from the following figures, descriptions, and claims.

BRIEF DESCRIPTION OF THE DRAWINGS

For a more complete understanding of the present invention and the advantages thereof, reference is now made to the following description taken in conjunction with the accompanying drawings, wherein like referenced numerals represent like parts, in which.

DETAILED DESCRIPTION OF THE INVENTION

FIGS. 1 through 4 illustrate a priority communication system and method of operation. As described in greater detail below, the priority communication system comprises a switching system operable to communicate with a number of communication devices over a limited number of communication channels. The switching device assigns a received communication signal a priority rating. The switching system assigns the received communication signal an open communication channel based on the priority rating of the received signal. In some applications, the switching system terminates a previously assigned communication signal, or communications link, having a priority rating lower than the priority rating of the received communication signal, in order to open a communication channel for the received communication signal.

Figure 1:
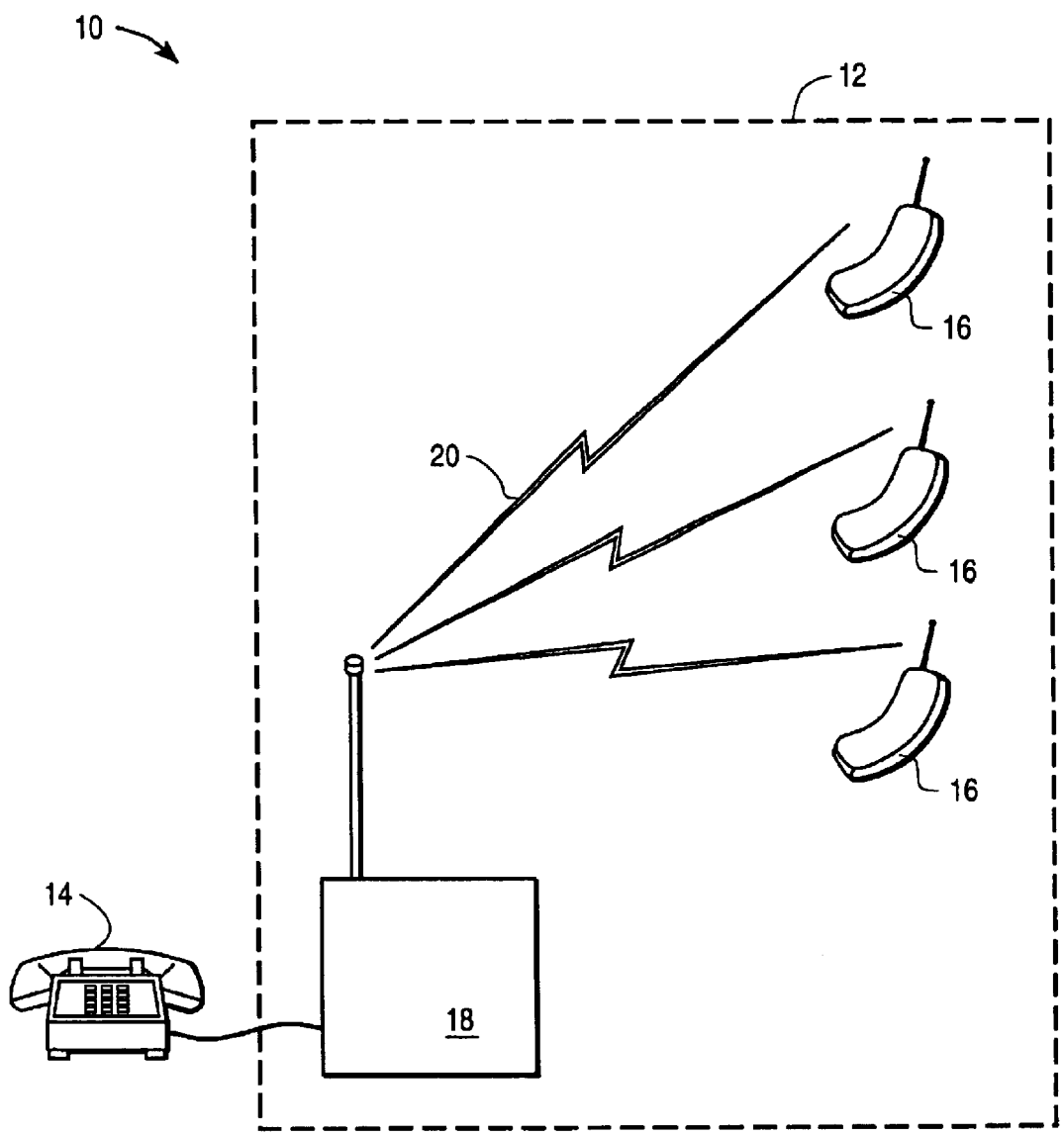
FIG. 1 illustrates a schematic diagram of a simplified communication system having a priority communication system in accordance with the present invention.

FIG. 1 is a schematic diagram illustrating a simplified communication system 10 comprising a priority communication system 12 and a peripheral communication device 14.

The priority communication system 12 comprises a number of communication devices 16 and a switching system 18. The switching system 18 communicates with the communication devices 16 over a limited number of communication channels 20, wherein the number of communication devices 16 is greater than the number of communication channels 20. The switching system 18 operates to establish a direct communications link between an individual communication device 16 and the peripheral communication device 14 over, at least in part, a communication channel 20.

The priority communication system 12, as illustrated in FIG. 1, is a cordless telephone system. In this embodiment the switching system 18 comprises a base station, the communication devices 16 comprise handsets, and the communication channels 20 are radio frequency channels. Although the priority communication system 12 is illustrated as a cordless telephone system, it will be understood that the priority communication system 12 may be used in any suitable type of communication system. For example, the priority communication system 12 may be used in telecommunication systems, cellular phone networks, satellite communication systems, wireless systems, pager systems, and the like, without departing from the scope of the present invention.

The communication devices 14 and 16 may be any suitable type of receiver, transmitter, or transceiver. For example, a fax machine and telephone are both transceivers in that they can both transmit and receive communication signals. A pager system utilizes a transmitter to send a signal and a receiver to receive the paging signal.

The type of communication channels 20 depends upon the type of switching system 12 and communication devices 16 used in the priority communication system 12. For example, the communication channels 20 may be phone lines as used in telecommunication systems, radio frequencies as used in cordless telephone systems and cellular phone systems, microwave channels as used in long distance telecommunication systems and satellite communications systems, and any other suitable communication medium.

The switching system 18, as will be discussed in greater detail below, establishes a direct communications link between an individual communication device 16 and the peripheral communication device 14 on a priority basis. In particular, when there is an open communication channel 20, the switching system 18 establishes a communications link between the respective communication devices 14 and 16. When an open communication channel 20 is not available, the switching system 18 compares the priority rating of the requested communication link with the priority rating of the communication links on the other communication channels 20. When the requested communication link has a higher priority rating than the other communication links, the switching system 18 terminates a lower priority communications link in order to open a communications channel 20 for the requested communications link.

Figure 2:
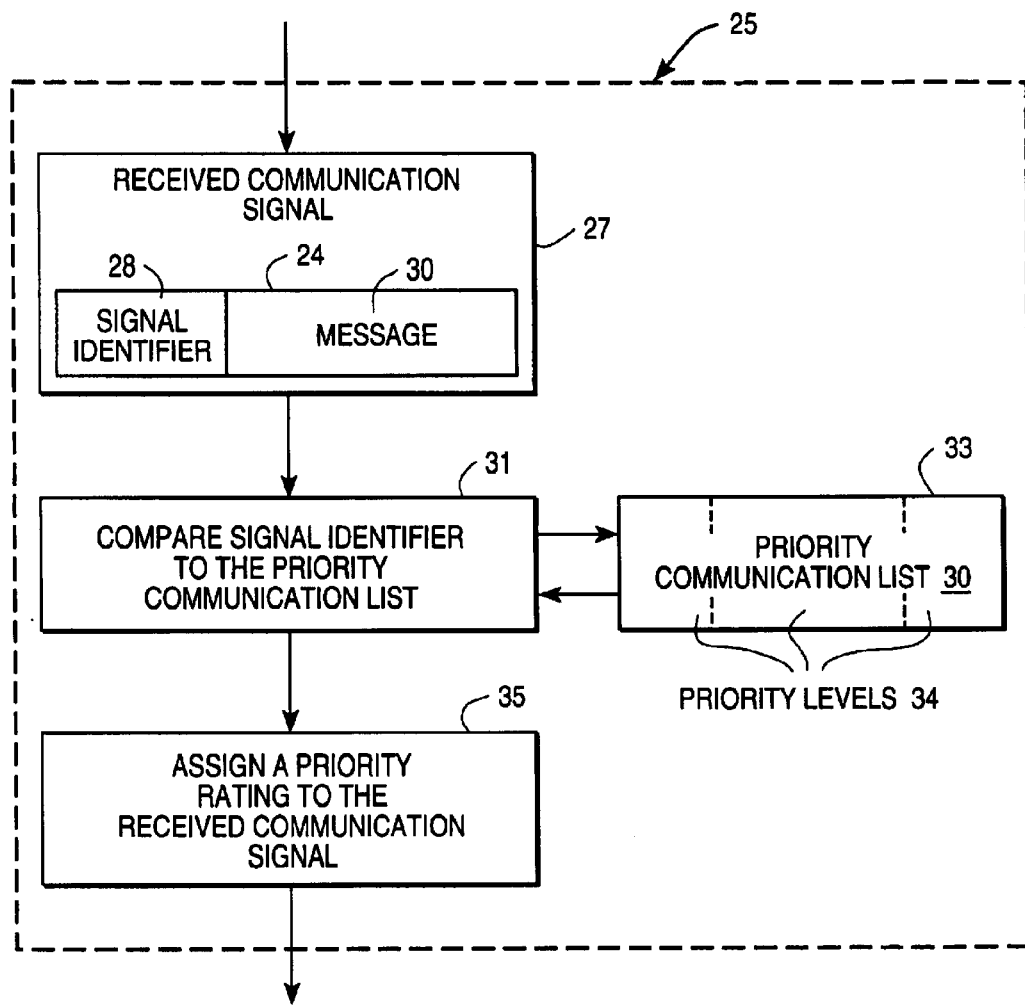
FIG. 2 is a flow diagram illustrating the operation of assigning a priority rating to a received communication signal in accordance with the present invention.

FIG. 2 is a flow diagram illustrating the operation of assigning a priority rating to a received communication signal 24, as shown by step 25. The switching system 18 receives the communication signal 24 from either the peripheral communication device 14 or one of the communication devices 16, as shown by step 27. The communication signal 24 comprises a signal identifier 28 and a message 30. As will be described in greater detail below, the signal identifier 28 provides information for prioritizing the communication signal 24.

The signal identifier 28 is compared to a priority communication list 30, as shown by steps 31 and 33, respectively. The priority communication list 30 comprises a list of priority signal identifiers. In a particular embodiment, the priority communication list 30 comprises various priority levels 34 that allows each priority signal identifier to be assigned a respective priority level. The communication signal 24 is then assigned a priority rating based on the comparison of the signal identifier 24 to the priority signal identifiers contained within the priority communication list 30, as shown by step 35. The switching system 18 can be configured to allow the priority communication list 30 to be easily modified by reprogramming.

In one embodiment, the signal identifier 28 comprises a destination phone number of the communication signal 28. Accordingly, the priority communication list 30 comprises a list of priority phone numbers. In this embodiment, a priority rating is assigned to the communication signal 24 by comparing the destination phone number to the priority phone numbers. For example, if the destination phone number is not one of the priority phone numbers, the communication signal 24 has a low priority. Whereas, if the destination phone number is one of the priority phone numbers, the communication signal is assigned the respective priority rating. In particular, different priority phone numbers may have different priority levels. For example, emergency phone numbers will generally have the highest priority rating.

In another embodiment, the signal identifier 28 comprises a password entered into the respective communication device 14 or 16 prior to initiating the communication signal 28. The password allows a user to establish a communications link during periods of peak usage. For example, during a period of peak usage, a user may need to make a business conference call that is more important than at least one of the communication links on the communication channels 20.

In yet another embodiment, the signal identifier 28 comprises an identification tag that is specific to the communication devices 14 or 16. For example, a handset assigned to the president of a corporation may automatically include an identification tag that gives that handset priority to establish a communications link.

In a further embodiment, the signal identifier 28 is determined by whether the communication signal 28 was initiated by the peripheral communication device 14 or the communication device 16. For example, a higher priority rating may be assigned to communication signals 24 that originate from the communication devices 16.

The various embodiments of signal identifiers 28 may also be combined to further optimize the priority communication system 12. For example, the signal identifier 28 may comprise a phone number, and a password that allow a user to override the system defaults by using the password. It will be understood that the signal identifier 28 may comprise any suitable electronic identifier or combination of electronic identifiers without departing from the scope of the present invention.

The various types of signal identifiers 28 and the ability to quickly modify the priority communication list 30 increases the flexibility of the priority communication system 12. In addition, the priority communication system 12 can be uniquely and easily customized to meet the requirements of various customers. Furthermore, customer safety may be improved by providing a priority communication system 12 that can establish a communications link in an emergency.

Figure 3:
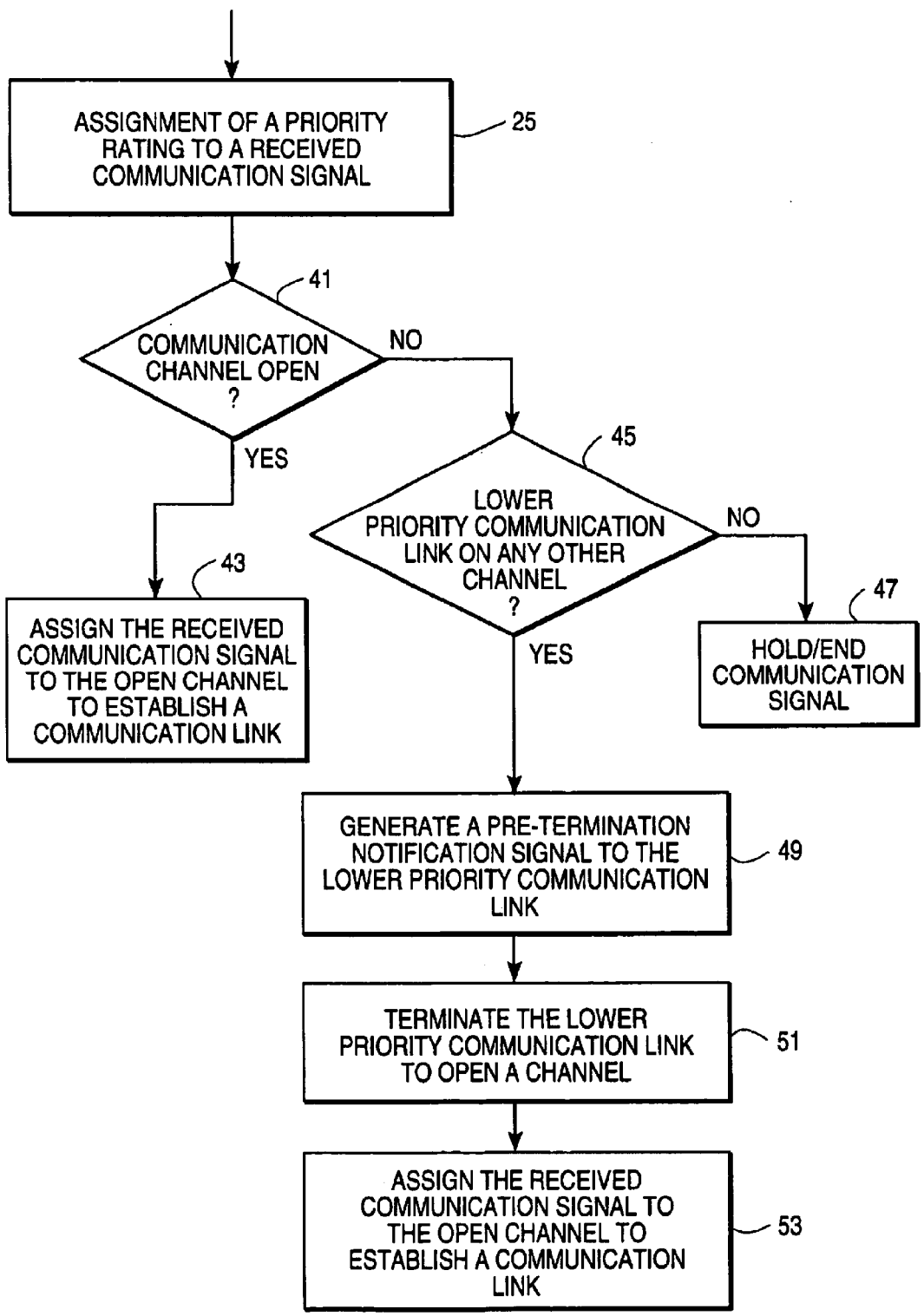
FIG. 3 is a flow diagram illustrating the operation of a switching system in accordance with the present invention.

FIG. 3 is a flow diagram illustrating one embodiment of the operation of the switching system 18. As described previously in FIG. 2, the received communication signal 24 is assigned a priority rating, as shown by step 25. When a communication channel 20 is open, the received communication signal 24 is assigned to the open communication channel 20 and a communication link is established, as shown by steps 41 and 43. When a communication channel 20 is not open, the priority rating of the received communication signal 24 is compared to the priority rating of the communication links on the other communication channels 20, as shown by steps 41 and 45. When a lower priority communication link is not found, the communication signal is placed on hold until an open communication channel becomes available, or the communication signal is ended, as shown by step 47. When a lower priority communication link is found, a pre-termination notification signal is generated on the lower priority communication link in order to notify the users that the communication link will be terminated shortly thereafter, as shown by step 49. The lower priority communication link is then terminated to open a communication channel 20, as shown by step 51. The received communication signal 24 is then assigned to the open communication channel 20 and a communication link is established, as shown by step 53.

Figure 4:
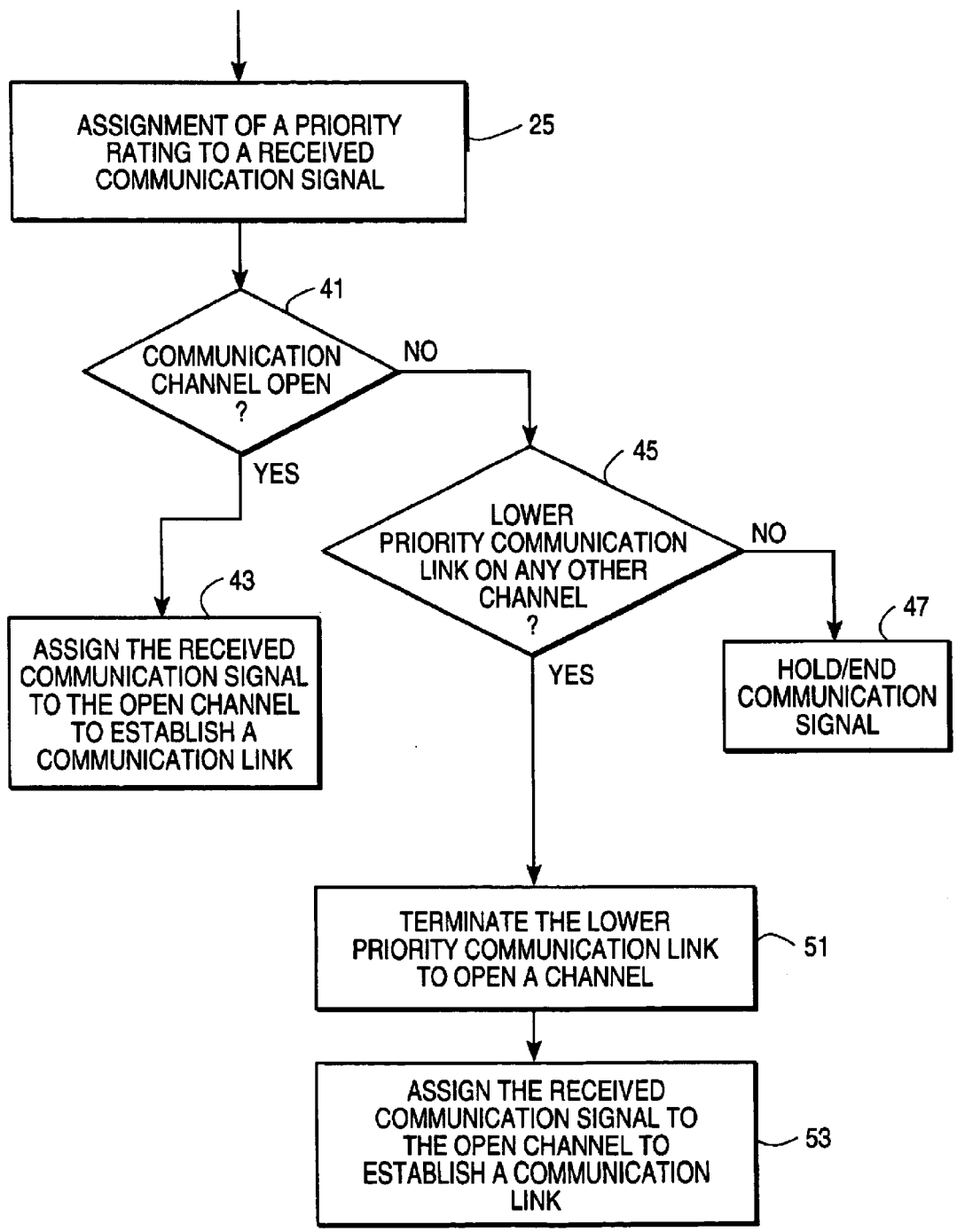
FIG. 4 is a flow diagram illustrating the operation of a switching system in accordance with another embodiment of the present invention.

FIG. 4 is a flow diagram illustrating another embodiment of the operation of the switching system 18. In this embodiment, the operation of the switching system 18 is the same as described in FIG. 3, with the exception that step 49, generating a pre-termination notice signal, is not performed. In this embodiment, the lower priority communication link is immediately terminated in order to provide an open communication channel for the received communication signal 24.

The embodiments illustrated in FIGS. 3 and 4 can also be combined. For example, in one embodiment, a first priority level is associated with standard communication signals 24 that do not have any priority, such as personal telephone calls. A second priority level is associated with communication signals 24 that have a higher priority than the standard communication signals, such as business telephone calls. A third priority level is associated with communication signals 24 that have a higher priority than second priority level communication signals, such as emergency telephone calls. In this embodiment, the first priority level communication signal has the lowest priority and cannot terminate a communication link. The second priority level communication signal can terminate a first priority level communication link, but only after providing a pre-termination notification signal to the lower priority communication link. The third priority level communication signal can terminate either a first or second priority level communication link, and terminates the lower priority communication link immediately in order to establish a communications link for the third level priority communication signal. It will be understood that other suitable steps may be included without departing from the scope of the present invention. For example, the time period that a communication link has been in operation may be used to determine priority.

In short, the present invention provides a direct communications link communication system that takes advantage of the lower cost of the communication system without sacrificing the ability to establish priority communication links during peak use periods. In addition, the present invention provides a method of prioritizing communications links based on the importance of the communication signal.

Although the present invention has been described in several embodiments, various changes and modifications may be suggested to one skilled in the art. It is intended that the present invention encompass such changes and modifications that fall within the scope of the appended claims.

What is claimed is:

1. A priority communication system comprising:
   a plurality of cordless telephones operable to communicate with a switching system over a limited number of communications channels dedicated to the cordless telephones, the number of cordless telephones being greater than the number of communication channels dedicated to the cordless telephones; and
   the switching system comprising one or more base stations and operable to:
      establish a direct communication link with any of the cordless telephones; and
      prioritize a plurality of received communication signals by assigning each received communication signal of a cordless telephone to an open communication channel based on a priority rating of the received communication signal to establish the direct communication link with a cordless telephone, the number of cordless telephones being greater than the number of base stations.

2. The priority communication system of claim 1, wherein the switching system is also operable to terminate a communication link having a priority rating lower than the priority rating of the received communication signal to yield the open communication channel; and
   assigning the received communication signal to the open communication channel to establish the direct communication link with a communication device.

3. A method of establishing a prioritized communication link comprising:
   providing a switching system for a cordless telephone system, the switching system for the cordless telephone system having a programmable priority communication list comprising a plurality of signal identifiers, the priority communication list associating each signal identifier with a priority rating, the switching system operable to establish a direct communication link with any of a plurality of communication devices over a limited number of communication channels dedicated to the communication devices;
   receiving a communication signal at the switching system, the communication signal having a signal identifier of the plurality of signal identifiers;
   assigning a priority rating to the received communication signal based on a comparison of the signal identifier and the priority communication list, the priority communication list associating the signal identifier with the priority rating;
   terminating a communication link having a lower priority rating than the received communication signal to open a communication channel; and
   assigning the received communication signal to the open communication channel to establish the prioritized communication link with a communication device.

4. The method of claim 3, wherein the signal identifier is a password entered into the respective cordless telephone, and the priority communication list comprises a list of passwords.

5. The method of claim 3, wherein the signal identifier comprises a phone number identifying a cordless telephone, and the priority communication list comprises a list of phone numbers.

6. The method of claim 3, wherein the signal identifier comprises a user identification tag specific to a cordless telephone, and the priority communication list comprises a list of priority user identification tags.

7. The method of claim 3, wherein the steps of assigning a priority rating, terminating a communication link, and assigning the communication signal comprises:
   assigning a priority level to the communication signal based on a comparison of the signal identifier and the priority communication list, and wherein:
      a first priority level operates to assign the received communication signal to the next available open communication channel to establish the prioritized communication link; and
      a second priority level operates to provide a communication link with a pre-termination notification signal prior to terminating the communication link in order to open a communication channel, the received communication signal is then assigned to the open communication channel to establish the prioritized communication link.

8. The method of claim 7, wherein the first priority level is associated with a communication signal having a signal identifier that is not recognized in the priority communication list.

9. The method of claim 7, wherein the second priority level is associated with a communication signal having a signal identifier that is recognized in the priority communication list.

10. The method of claim 7, further comprising a third priority level that operates to immediately terminate a lower priority level communication link in order to open a communication channel, the received communication signal is then assigned to the open communication channel to establish the prioritized communication link.

11. A method of establishing a prioritized communication link in a wireless communication system, the method comprising:
   providing a base station for a cordless telephone system, the base station having a programmable priority communication list comprising a plurality of signal identifiers, the priority communication list associating each signal identifier with a priority rating, the base station operable to establish a direct communication link with any of a plurality of cordless handsets over a limited number of radio frequency channels dedicated to the cordless handsets, the number of cordless handsets being greater than the number of communication channels dedicated to the cordless handsets;
   receiving a communication signal at the base station, the communication signal having a signal identifier of the plurality of signal identifiers;
   prioritizing a plurality of received communication signals by assigning a priority rating to each communication signal based on a comparison of the signal identifier and the priority communication list, the priority communication list associating the signal identifier with the priority rating;
   terminating a communication link having a lower priority rating to open a radio frequency channel; and
   assigning the communication signal to the open radio frequency channel to establish the prioritized communication link with a cordless handset.

12. The method of claim 11, wherein the signal identifier comprises a user identification code entered into the handset.

13. The method of claim 11, wherein the signal identifier comprises a user identification tag, and the priority communication list comprises a list of priority user identification tags.

14. The method of claim 11, wherein the steps of assigning a priority rating, terminating a communication link, and assigning the communication signal comprises:
   assigning a priority level to the communication signal based on a comparison of the signal identifier and the priority communication list, and wherein:
      a first priority level operates to assign the received communication signal to the next available open radio frequency channel to establish the prioritized communication link; and
      a second priority level operates to provide a lower priority level communication link with a pre-termination notification signal prior to terminating the lower priority level communication link in order to open a radio frequency channel, the received communication signal is then assigned to the open radio frequency channel to establish the prioritized communication link.

15. The method of claim 14, wherein the first priority level is associated with a communication signal having a signal identifier that is not recognized in the priority communication list.

16. The method of claim 14, wherein the second priority level is associated with a communication signal having a signal identifier that is recognized in the priority communication list.

17. The method of claim 14, further comprising a third priority level that operates to immediately terminate a previously assigned communication signal having a lower priority rating in order to open a communication channel, the third priority level communication signal is then assigned to the open communication channel to establish the prioritized communication link.

18. A system for establishing a communication link, comprising:
   a plurality of cordless telephones for a cordless telephone system; and
   a switching system for the cordless telephone system having a priority communication list associating a plurality of signal identifiers with a plurality of priority ratings, the switching system operable to:
      establish a communication link with any of the cordless telephones over a limited number of communication channels;
      receive a communication signal having a signal identifier of the plurality of signal identifiers;
      assign a first priority rating to the received communication signal according to the priority communication list;
      terminate a first communication link associated with a second priority rating to open a communication channel; and
   assign the received communication signal to the open communication channel to establish a second communication link.

19. The system of claim 18, wherein the switching system is operable to provide the first communication link with a pre-termination notification signal prior to terminating the first communication link.

20. The system of claim 18, wherein the switching system is operable to immediately terminate the first communication link.

21. The system of claim 18, wherein the switching system is operable to assign a communication signal associated with a second priority rating to an open communication channel to establish a communication link with a cordless telephone.

22. The system of claim 18, wherein the signal identifier comprises a password entered into a cordless telephone.

23. The system of claim 18, wherein the signal identifier comprises a phone number identifying a cordless telephone.

24. The system of claim 18, wherein the signal identifier comprises a user identification tag specific to a cordless telephone.

\* \* \* \* \*